United States Patent

[11] 3,628,707

| [72] | Inventor | Erhard Hieke<br>Hamburg-Stellingen, Germany |
|---|---|---|
| [21] | Appl. No. | 860,314 |
| [22] | Filed | Sept. 23, 1969 |
| [45] | Patented | Dec. 21, 1971 |
| [73] | Assignees | Norddeutsche Affinerie<br>Hamburg, ;<br>C. F. Spiess & Sohn, Chemische Fabrik<br>Kleinkarlbach, Germany |
| [32] | Priority | Sept. 28, 1968 |
| [33] | | Germany |
| [31] | | G 67 52 970 |

[54] PACKING CONTAINER FOR SCATTERABLE PARTICULATE MATERIAL
6 Claims, 5 Drawing Figs.

[52] U.S. Cl. .................................................. 222/567
[51] Int. Cl. .................................................. B65d 25/48
[50] Field of Search ...................................... 222/532,
478, 330, 565, 567, 570, 573, 574, 176; 239/688,
689, 650, 653, 655, 378–380; 229/22

[56] References Cited
UNITED STATES PATENTS

| 734,887 | 7/1903 | Kilgore .................. | 239/379 |
| 1,252,543 | 1/1918 | Bretton .................. | 222/532 |
| 2,337,952 | 12/1943 | Whiten ................... | 239/653 X |
| 2,969,862 | 1/1961 | Worrell .................. | 239/650 X |
| 3,222,190 | 12/1965 | Davis ..................... | 229/22 X |

FOREIGN PATENTS

| 978,275 | 11/1950 | France .................. | 222/567 |

*Primary Examiner*—Robert B. Reeves
*Assistant Examiner*—John P. Shannon, Jr.
*Attorney*—Burgess, Dinklage & Sprung ABSTRACT: A combination package and spreader for scatterable particulate solid material such as seed or fertilizer including a container, suitable for holding the particulate material, having at least one lower edge, which edge has at least one aperture therein and means to keep this aperture closed during shipment of the container; and a spreader surface means removably attached to the container below the orifice for receipt of material exiting the container through the orifice and direction of this material in a spreading pattern on a suitable surface. The spreader means suitably flares outwardly from the container and may be arcuate about a longitudinal axis.

PATENTED DEC 21 1971 3,628,707

Inventor:
Erhard Hieke
By: Burgess, Dinklage
& Sprung
Attorneys

PACKING CONTAINER FOR SCATTERABLE PARTICULATE MATERIAL

The invention relates to a packing container for scatterable particulate materials, such as fertilizers, weed killers and the like, which has a device incorporated therein for distributing the said materials directly from the package onto the surfaces to which they are to be applied.

Generally, bags, cartons, drums and the like are used for packing particulate scatterable materials, while separate devices such as fertilizer spreaders are used for scattering such materials. If such spreading machines are not available, the particulate material is spread by hand; this is particularly the case in the cultivation of small areas. Direct skin contact with fertilizers, weed killers and the like is sometimes unpleasant and sometimes harmful. Therefore a disposable package has already been proposed which was supposed to make it possible to distribute the material from the package by mounting a sprinkler tube thereon without the operator coming in direct contact with the particulate materials. By this technique, the material was spread on the ground by oscillatory movements of the spreader tube. This technique, however, raised difficult handling problems. Moreover, uniform distribution of the scatterable particulate material depended greatly on the skill of the operator.

It is the object of this invention to reduce the physical effort required in spreading such materials, and also to make the uniform distribution of such material independent of the skill of the operator of the spreading device.

Other and additional objects will become apparent from a consideration of this entire specification including the claims and drawing.

In accordance with and fulfilling these objects, one aspect of this invention resides in a novel packing container for scatterable particulate materials, such as fertilizers, weed killers and the like, having a device for spreading the said materials directly from the packing container onto the application surfaces. The packing container has in one of its walls, preferably in the vicinity of a bottom edge, discharge orifices distributed over the width of the wall, and has, underneath these orifices, spreading surface means disposed at an angle to the wall containing the orifices.

After the discharge orifices are opened, the container need only be carried in a suitable position over the surface to be spread in order to properly scatter the contents thereof and no additional scattering movement is required.

The spreading width and the way in which the material is distributed over the surface in question can be varied by appropriately shaping the spreader surface and/or the orifice sizes. For example, spreading can be done over a 50 to 100 cm. wide path without additional movement of the spreading device if the edge of the spreader surface means adjacent the container wall has a width substantially equal to the width of the container wall that is provided with the discharge orifices, and, if the edge of the spreader surface means opposite to the orifice containing wall has a greater width.

The uniformity of the distribution can be substantially improved in the above-mentioned embodiment of the spreading device if the spreader surface means curves uniformly downward from its longitudinal axis.

The discharge orifices and the spreader surface means can be located on the front or on the side of the container, depending on how the container is to be carried during the spreading operation. The number of discharge orifices and the size and shape thereof determines the spreading density, dependent on the structure of the material to be spread. In the case of a material having an average grain size of about 0.5 to 2 mm. and a weight of about 1.25 kg. per liter, three rectangular orifices of approximately 1×1 cm., for example, can be punched in the sidewall of a container of conventional size. If the container has a capacity of 5 kg., it will take about seven minutes to empty it through these orifices. At a slow walk, in this case, a spreading density of 500 kg. per hectare will be achieved.

Depending on the material being spread and the desired coverage per hectare, the discharge orifices may be varied to round holes, triangular holes, slits or other shapes.

Uniform delivery of the scatterable material to the spreadable surface means can be achieved by arranging the perforations in the container in relation to the shape of the spreader surface means, or by placing the spreader surface means spaced from and below the perforations.

Depending on how it is desired to distribute the scatterable material being spread, the spreader surface means can also have a shape other than that described above, according to the intended purpose. For example, it may be desirable to provide grooves running lengthwise in the spreader surface if the material is to be laid down in a plurality of stripes. It is desirable to select a spreader surface of this kind when it is desired to fertilize seed drills or to combat weeds between rows of crops. In this case it is advantageous to provide one discharge orifice in the container wall associated with each of the said longitudinal grooves. The packing container can be of any desired conventional or unconventional shape. If it is desired to empty the container in one operation, the container is so constructed, or is so positioned by the attachment of carrying straps, that the edge in whose area the discharge orifices are located points downward as the container is being carried. However, a box design has proven particularly advantageous in which two opposite sidewalls have the shape of a triangle, preferably an equilateral triangle, and are joined together by three rectangular to triangular walls. If, when such a container is being emptied, the edge in the vicinity of the discharge orifices is held in an approximately horizontal position so that the opposite edges are substantially higher, an especially uniform flow of the material being distributed is achieved, and hence there is a particularly uniform or easily controllable distribution on the surface being treated.

Various qualities of cardboard, or plastics or other materials can be used in making the package of this invention. The spreader surface means can best be made also of cardboard, plastic or the like.

It is desirable to removably attach the spreader surface means to the package, so that different spreader surface means can be used according to the type of spreading desired. This offers the additional advantage that a spreader plate means can be separately included with the scatterable material in shipment so that no damage to the bag or package need be expected, and efficient use is made of the packing space in a most desirable manner.

The curved shape of the spreader surface can be achieved automatically by the way in which it is attached. For example, if the mounting means for the spreader is a rounded piece of material affixed to the container below the discharge orifices. The spreader can be attached by inserting tabs thereof through the said mounting means which are provided on the corresponding edge of the spreader.

The invention will be better understood with reference to the accompanying drawing therein:

Figure 1:
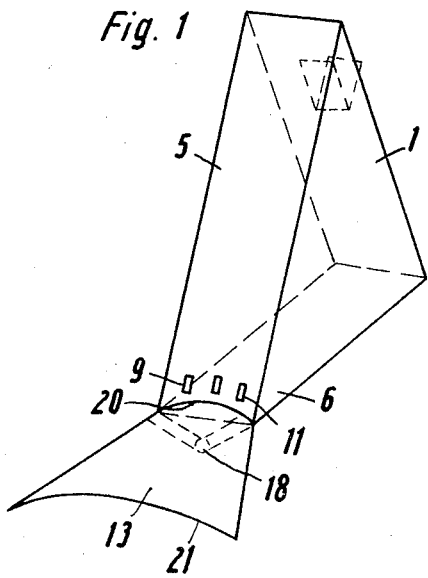
FIG. 1 shows a perspective view of a packing container which is triangular in side elevation, having a curved spreader surface.
Figure 3:
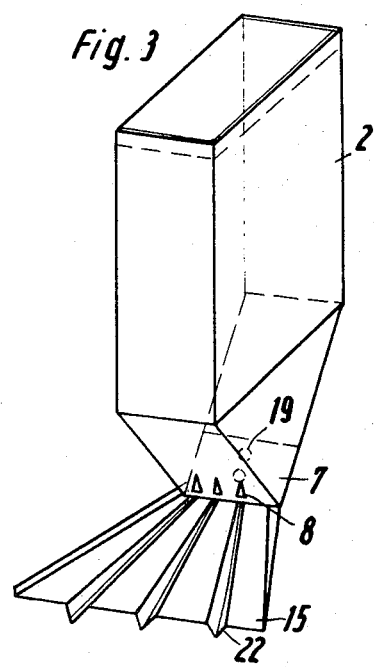
FIG. 3 is a perspective representation of a hopper-shaped packing container having a spreader surface which is provided with grooves.
Figure 2:
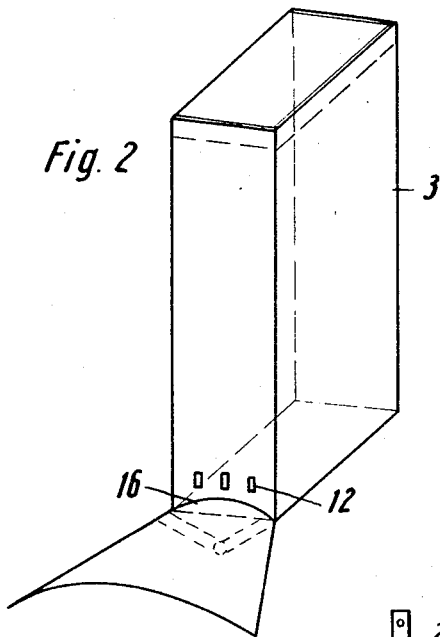
FIG. 2 is a perspective representative of a packing container having a curved spreader surface.
Figure 4:
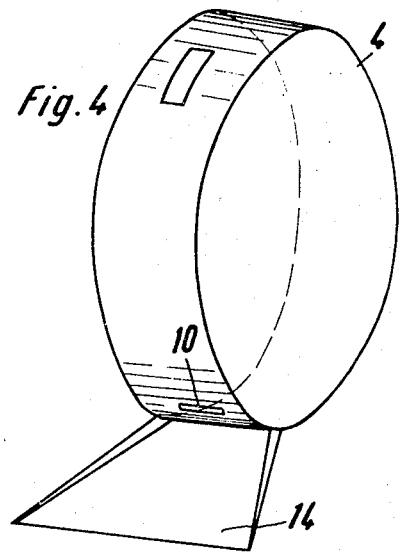
FIG. 4 is a perspective representation of a drum-shaped container having a flat spreader surface.
Figure 5:
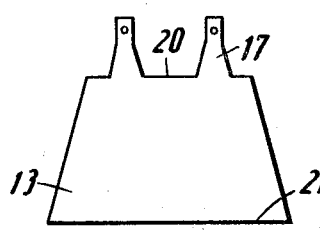
FIG. 5 is a plane view of a removably fastenable spreader with fastening tabs.

In the drawings, a packing container is shown with triangular sidewalks 1, with rectangular shaped walls 2, with prismatic walls 3 and with circular walls 4. The remaining walls of the containers 5 are provided with discharge orifices 8, 9, 10, 11 and 12. The discharge orifices can have different shapes such as shown. The discharge orifices 8 (FIG. 3) are triangular, the orifices 9 (FIG. 1) are quadrangular, the orifice 10 is a slot extending over the width of the sidewall of the container (FIG. 4), the orifice 11 (FIG. 1) is arcuate, and orifices 12 have a vertical long axis. An arcuate spreading device 13 shown in FIGS. 1 and 2 is an edge 20 adjacent the container which is shorter than its opposite edge 21. A spreader 14 is shown in FIG. 4 similar to the spreader 13, but with a flat surface. A spreader 15 is shown in FIG. 3 of the same shape as the spreader 14, but having longitudinal grooves 22 each of which is associated with one discharge orifice 8. A segment-shaped mounting 16 shown in FIGS. 1 and 2 serves for the fastening of a removable spreader thereonto. Such a spreader is shown in FIG. 5. It has on its edge 20 tabs 17 by means of which the spreader is fastened to the mounting means 16 on the container. The tabs are inserted through this mounting means and then drawn tightly until the edge 20 abuts the container wall 5. To secure the spreader in position, the tabs 17 can be fastened to one another by means of snap fasteners 18 or in any other conventionally known manner. This fastening, however, is described only by way of example, and any other suitable kind of fastening can be selected.

What is claimed is:

1. A combination package and spreader for particulate scatterable material comprising a container for said particulate scatterable material having a sidewall, having an edge at the lower end thereof; and having at least one aperture in said sidewall of said container above and adjacent said edge; and outwardly disposed plate means attached to said sidewall at said edge spaced from and below said aperture which plate means extends at an angle of at least about 90° from said wall wherein said plate means is of a width substantially equal to the width of said wall at the wall joining end thereof and is of a wider width at the end opposite to the wall joining end thereof.

2. A package and spreader combination as claimed in claim 1 wherein said plate is downwardly arcuate about a longitudinal axis thereof.

3. A package and spreader combination as claimed in claim 1 wherein said plate has longitudinal channels therein.

4. A package and spreader as claimed in claim 3 including a channel associated with each of a multiplicity of apertures.

5. A package and spreader as claimed in claim 1 wherein said plate is releasably attached to said wall.

6. A package and spreader as claimed in claim 1 wherein said container has substantially equilateral triangular sides and substantially rectangular walls.

* * * * *